No. 765,881.

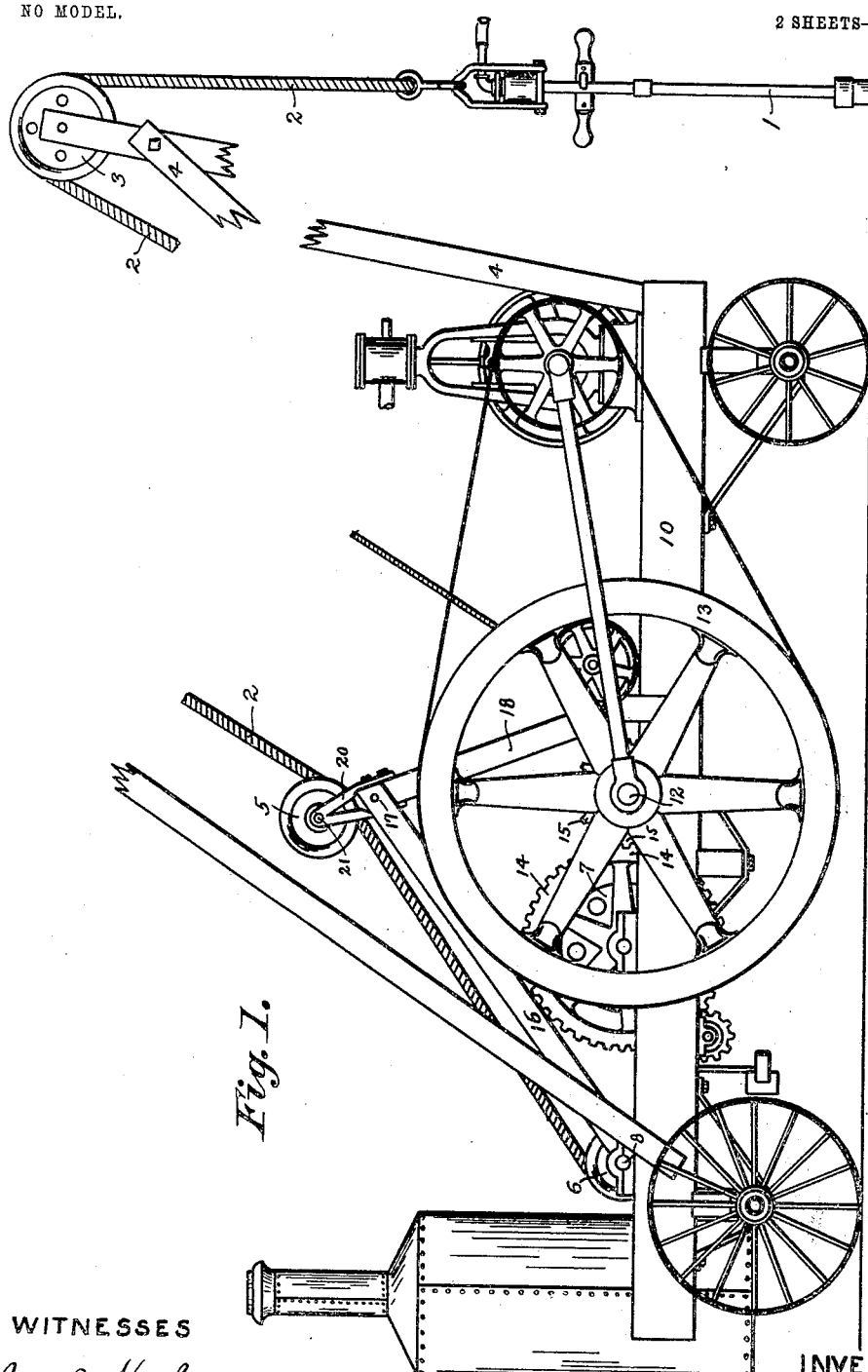

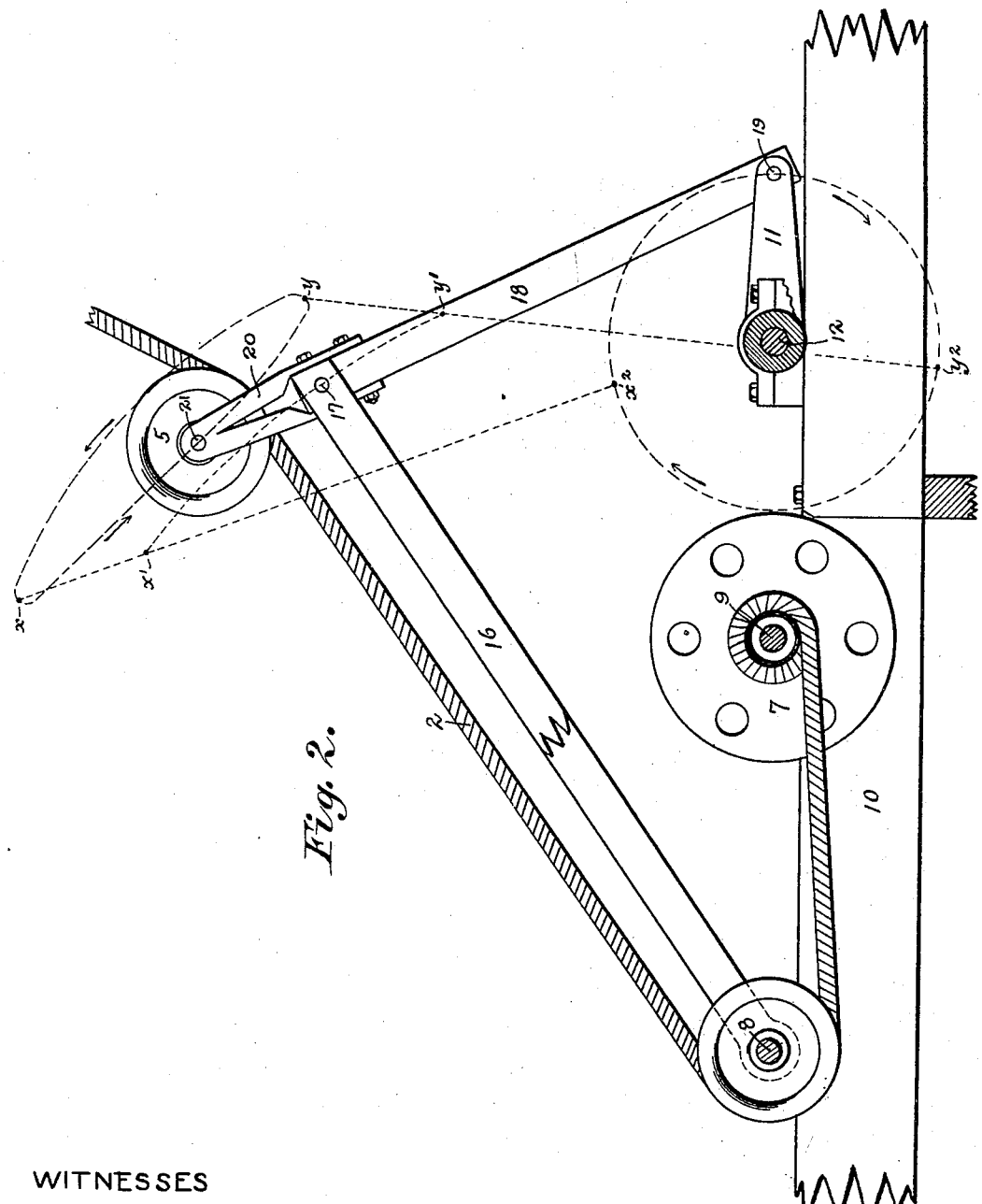

Patented July 26, 1904.

UNITED STATES PATENT OFFICE.

EDWARD CHRISTMAN, OF MASSILLON, OHIO.

DRILLING-MACHINE.

SPECIFICATION forming part of Letters Patent No. 765,881, dated July 26, 1904.

Application filed April 21, 1904. Serial No. 204,191. (No model.)

*To all whom it may concern:*

Be it known that I, EDWARD CHRISTMAN, a citizen of the United States, residing at Massillon, in the county of Stark and State of Ohio, have invented a new and useful Improvement in Drilling-Machines, of which the following is a specification.

The invention relates to the spudding mechanism in an ordinary derrick drilling-machine; and the object of the improvement is to provide a spudder which will raise the drill slowly and then permit it to drop quite quickly, by means of which movement the drill performs its work with a sharp and sudden blow. This object is attained by the construction, arrangement, and mechanism illustrated in the accompanying drawings, in which—

Figure 1 is a side elevation of an ordinary drilling-machine, showing the improved spudding mechanism; and Fig. 2, an enlarged elevation of the spudding mechanism.

Similar characters refer to similar parts throughout the drawings.

The drill 1 is attached on the free end of the rope or cable 2, which cable passes directly upward over the crown-pulley 3 at the top of the derrick 4, thence downward under the spudding-sheave 5, and rearward over and around the idle pulley 6, and thence forward and around the drum 7, to which it is attached and on which it is adapted to be wound. The idle pulley-shaft 8 and the drum-shaft 9 are journaled on the bolsters 10, which constitute the respective side members of the frame of the drilling-machine, and the crank 11 is mounted on the shaft 12, which is likewise journaled on the bolsters. The drive-wheel 13 is mounted on the crank-shaft, and power is communicated to the drum-shaft by the gear 14 thereon, all of which devices are common and ordinary in drilling-machines.

The rocker-arm 16 is mounted at its lower end, preferably on the idle pulley-shaft, and is joined by the pivot 17 to the connecting-rod 18 at its upper end, which rod is joined by the pivot 19 to the free end of the crank, by means of which connections the rocker-arm is operated up and down on the idle pulley-shaft as a center by the rotation of the crank on its shaft in the usual manner. Instead of mounting the spudding-sheave 5 on the rocker-arm connecting-bar pivot 17, which has been the practice heretofore, the connecting-bar is provided with the extension 20 above the rocker-arm and the spudding-sheave is mounted on the upper free end of this extension by the pivot 21. By reason of this extension of the connecting-bar a peculiar throw is given to the spudding-sheave, to the effect that its upward movement is accomplished more quickly than its downward movement. This effect is illustrated diagrammatically in Fig. 2, wherein the paths of the several pivots are shown by broken lines, and the center line of the connecting-rod when the spudding-sheave is at its highest and lowest positions is shown by dotted lines. It will be seen that when the sheave-pivot is at its highest position at $x$ the rocker-arm pivot is at $x'$ and the crank-pivot is at $x^2$, and that when the crank is rotated in the direction indicated by the arrow to bring the rocker-arm pivot down to $y'$ and the sheave-pivot down along its path in the direction indicated by the arrow to its lowest point at $y$ the crank-pivot has traveled more than half-way around its circular path to $y^2$, and finally that when the crank is further rotated in the same direction and the sheave-pivot is carried upward along its path, as indicated by the arrow, to its highest position at $x$, with the rocker-arm pivot at its original position at $x'$, the crank-pivot has only traveled the remaining less than half around its circle to the initial position at $x^2$. In other words, when the crank-shaft is rotated at a regular rate of speed in the usual manner it must go more than half-way around to bring the spudding-sheave from its highest to its lowest position, and consequently the sheave is raised more quickly than it is lowered, and as the drill is raised and permitted to drop in the usual manner by the successive depression and elevation of the spudding-sheave it consequently drops more quickly than it is raised, and a further advantage of mounting the spudding-sheave on the extended connecting-bar is in the fact that the sheave is moved in a constantly-varying path and wears against the rope throughout a considerable section of its length instead of constantly wearing at one point, as it does when the sheave is mounted in the rocker-arm connecting-bar pivot.

What I claim as my invention, and desire to secure by Letters Patent, is—

1. In a drilling-machine, a derrick with a crown-pulley thereon at the forward end, a shaft with an idle pulley thereon at the rear end, and a shaft with a crank thereon intermediate the ends, in combination with a spudding mechanism comprising a rocker-arm on the pulley-shaft, a connecting-bar pivotally joined to the free ends of the arm and the crank and having one end extended above the arm, a sheave on the extended end of the bar and a cable attached to the machine and passed over the pulleys and under the sheave and having a drill on its free end.

2. A spudding mechanism for a drilling-machine comprising a rocker-arm, a crank, a connecting-bar pivotally joined to the free ends of the crank and the arm and having one end extended beyond the arm, and a sheave on the extended end of the bar.

In testimony whereof I have signed my name to this specification in the presence of two subscribing witnesses.

EDWARD CHRISTMAN.

Witnesses:
J. H. NOLD,
WILLIAM THORNBURGH.